United States Patent [19]
Sugiyama et al.

[11] Patent Number: 6,046,795
[45] Date of Patent: Apr. 4, 2000

[54] DISTANCE MEASURING INSTRUMENT

[75] Inventors: Osamu Sugiyama; Nobuo Hirata; Hajime Fukamura; Akio Izumi, all of Nagano, Japan

[73] Assignee: Fuji Electric Co., Ltd., Kawasaki, Japan

[21] Appl. No.: 09/195,045

[22] Filed: Nov. 19, 1998

[30] Foreign Application Priority Data

Jan. 28, 1998 [JP] Japan .................................. 10-014719
Jul. 21, 1998 [JP] Japan .................................. 10-204584

[51] Int. Cl.⁷ .............................. G01C 3/08; G02B 7/04; G03B 13/00
[52] U.S. Cl. ...................... 356/3.14; 250/201.6; 396/114; 396/121; 396/128
[58] Field of Search ................................. 356/3.01, 3.14; 396/114, 121, 128; 250/201.6

[56] References Cited

U.S. PATENT DOCUMENTS

| | | |
|---|---|---|
| 4,313,654 | 2/1982 | Matsui et al. . |
| 4,529,287 | 7/1985 | Karasaki et al. . |
| 4,662,735 | 5/1987 | Karasaki et al. . |
| 5,233,382 | 8/1993 | Taniguchi et al. . |
| 5,721,994 | 2/1998 | Ogata et al. ............................ 396/317 |
| 5,745,805 | 4/1998 | Iyama ....................................... 396/97 |

FOREIGN PATENT DOCUMENTS

| | | |
|---|---|---|
| 63-253317 | 10/1988 | Japan . |
| 8-267585 | 10/1996 | Japan . |
| 9-96524 | 4/1997 | Japan . |
| 9-176223 | 7/1997 | Japan . |

*Primary Examiner*—Stephen C. Buczinski
*Attorney, Agent, or Firm*—Kanesaka & Takeuchi

[57] ABSTRACT

A measuring instrument is formed of an image pickup device having a pair of image-forming lenses and photosensor arrays; and an arithmetic device using two images of a measured object photographed by the image pickup device to calculate the distance to the object based on the principle of triangulation. The image-forming lenses, a first holding member for the image-forming lenses and a second holding member for the photosensor arrays are formed of the same plastic material without hygroscopicity. Changes in size of the measuring instrument by ambient temperature and humidity are prevented to increase distant measurement accuracy.

10 Claims, 11 Drawing Sheets

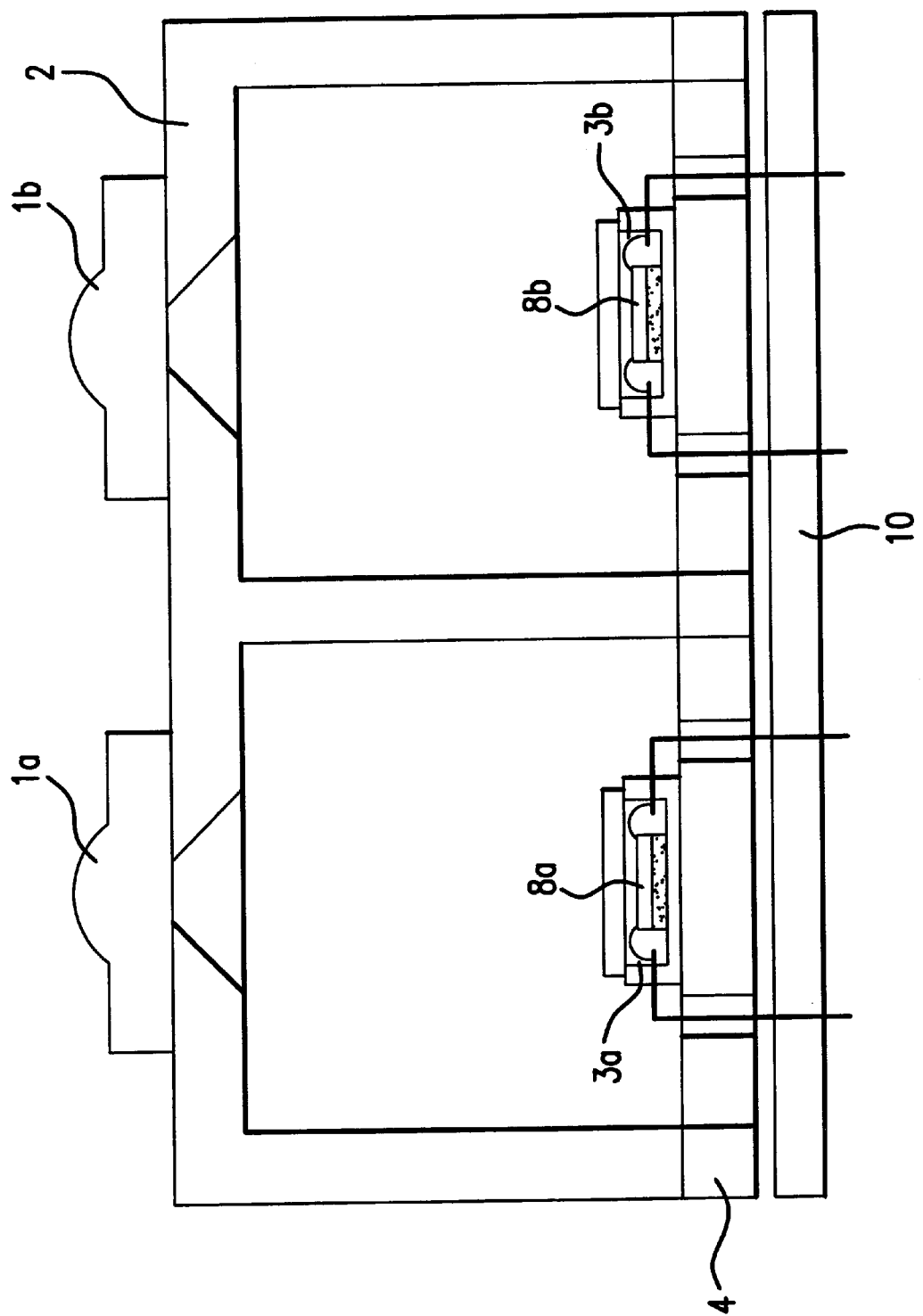

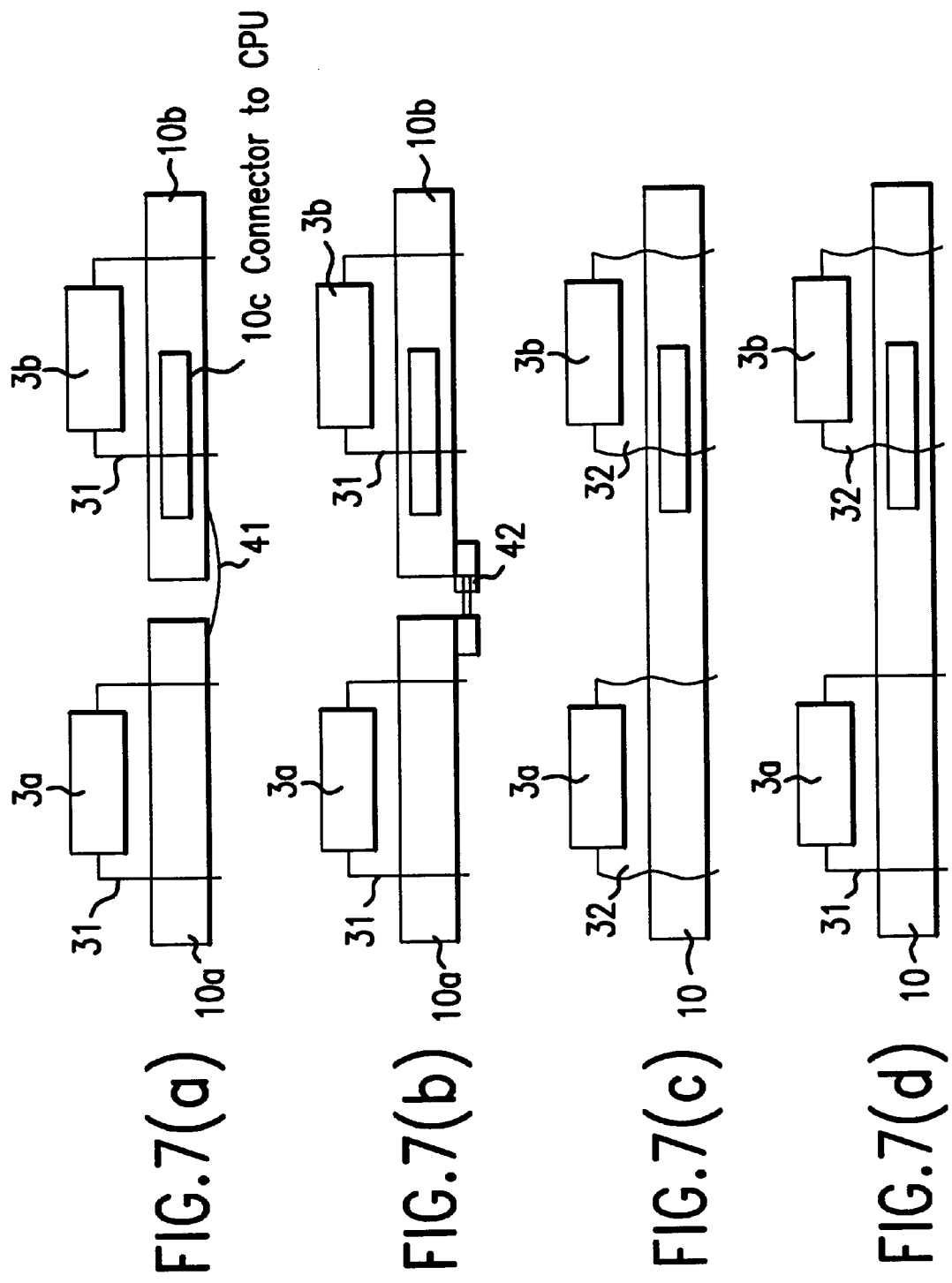

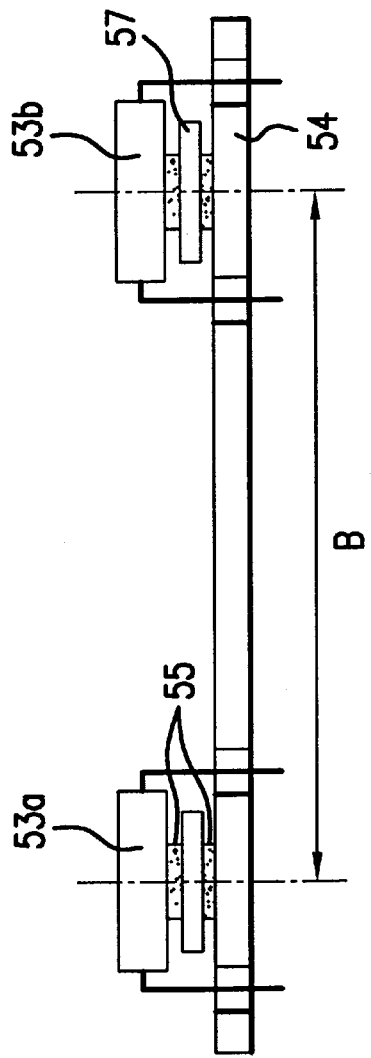
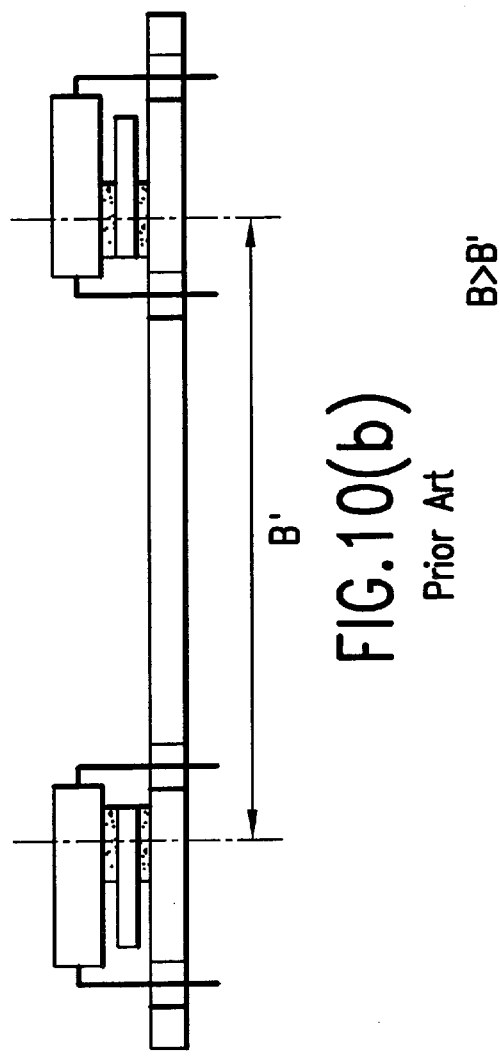
FIG.10(a) Prior Art
FIG.10(b) Prior Art
B>B'

DISTANCE MEASURING INSTRUMENT

BACKGROUND OF THE INVENTION AND RELATED ART STATEMENT

The present invention relates to a distance-measuring instrument mounted in an automobile to detect a distance to a front vehicle.

A conventional distance-measuring instrument for detecting a distance comprises image pickup means composed of a pair of image-forming means and photo sensor arrays; and arithmetic means using two images of a measured object photographed by the image pickup means to calculate the distance to the object based on the principle of triangulation.

First, the principle of triangulation is described in brief with reference to FIG. 8.

Image-forming lenses 51a and 51b form images 23 and 24 of an object on photo sensor arrays 25 and 26. Since triangles 27 and 28 are similar to triangles 27' and 28', respectively, the distance L to the object is expressed by Equation 1.

$$L=Bf/(x1+x2)=Bf/x$$

The inter-optical-axis distance (hereafter referred to as the "base length") B between the image-forming lenses 51a and 51b and the focal length (f) are constant, so the distance L to the object can be determined by detecting (x).

FIG. 9 shows a sectional view of a conventional distance-measuring instrument formed based on the principle of triangulation. This distance-measuring instrument consists of the image-forming lenses 51a and 51b, a lens-holding member 52, and CCD packages 53a and 53b which act as photosensor arrays, and a CCD holding member 54.

The image-forming lenses 51a and 51b are formed of polycarbonate plastic lenses having low water absorption and excellent optical characteristics. The CCD packages 53a and 53b are formed of ceramics, and the lens holding member 52 and the CCD holding member 54 are formed of aluminum die cast products having low thermal expansion so as to maintain locational accuracy between the lenses and between the CCDs.

In particular, the lens holding member 52 and the CCD holding member 54 are formed of the same material, that is, aluminum. Therefore, when they are thermally expanded, they advantageously contract equivalently only if a (UV+heat)-setting adhesive 55 is used to fix them together.

To join the image-forming lenses 51a and 51b and the lens-holding member 52 together, however, the (UV+heat)-setting adhesive 55 for fixing the positions and a thermosetting adhesive for maintaining the adhesive strength are used.

This is because the application of the (UV+heat)-setting adhesive 55 all over the lens surface allows the lens to be fixed firmly, but causes stress when the lens and the holding member 52 are heated due to the firm fixation on all the surface, causing aluminum to peel off the plastic surface due to the difference in linear expansion coefficient.

Thus, two adhesives must be used such that the (UV+heat)-setting adhesive 55 firmly fixes only one point of the lens, that is, the boss 51c, while a thermosetting adhesive 56 is used for most of the lens surface to provide good adhesive strength.

On the other hand, due to the difference in linear expansion coefficient between the ceramics and aluminum, direct connection of the CCD packages 53a and 53b and the CCD holding member 54 together causes thermal stress when they are expanded and contracted. Thus, an iron piece 57 having an intermediate linear expansion coefficient is placed between the packages and the holding member, and the (UV+heat)-setting adhesive 55 is used to fix them.

This reduces the thermal stress between these members due to changes in ambient temperature, and thus prevents peeling.

A breathing filter 59 in FIG. 9 discharges moisture in the enclosure to the exterior to equalize the humidity between the interior and exterior of the enclosure.

Even if, however, both the lens-holding member 52 and the CCD-holding member 54 are formed by an aluminum die cast product, both the CCD packages 53a and 53b and the image-forming lenses 51a and 51b can not be formed of the same material, and the thermal stress between the joined portions of the different types of materials can not be totally eliminated due to the difference in linear expansion coefficient.

For example, a silicone thermosetting adhesive 56 is used to join the plastic image-forming lenses 51a and 51b and the lens-holding member 52 of an aluminum material, and this silicone material acts as rubber particularly at a hot portion in order to prevent aluminum from being peeled off from plastics.

When the silicone thermosetting adhesive is thermally expanded at a hot portion, however, aluminum and plastics maintain the adhesive strength but do not return accurately to their original positions when contracted, resulting in a relative offset of 5 μm for the base length between the CCDS.

Based on the principle of triangulation, this offset of 5 μm corresponds to a distance-measuring error of about 4 m (relative to a true value L=30 m). Accordingly, even a minor offset between the materials significantly affects the distance measurement accuracy.

FIG. 10 shows the difference in locations at which the CCDs are adhered.

If the CCD packages 53a and 53b are fixed in such a way that their centers are spaced by the base length B as in FIG. 10(a), the thermal expansion between the CCDs only corresponds to the base length B of the CCD-holding member 54 and equals the thermal expansion between the image-forming lenses. Consequently, no error occurs in distance measurements.

If, however, for example, the CCD packages are fixed in such a way that the centers of the adhesives are spaced by a distance shorter than the base length as in FIG. 10(b), the thermal expansion between the CCDs decreases accordingly, and this results in a difference between this distance and the base length between the lenses. Reference B' designates the distance between the centers of the adhesives (B>B').

Since the surfaces of the CCDs and the CCD-holding member are adhered together via the iron piece 57, the centers of the adhesives do not necessarily align with the centers of the surfaces.

This is due to variation during the application of the adhesives (amount of adhesive applied, and amount and direction of pressure applied).

Thus, the locations of the centers of the adhesives may vary by ±5 mm at maximum.

The difference in expansion caused by this variation substantially affects the device, particularly on a hot side.

Furthermore, the thermal conductivities of aluminum and plastics differ in nearly 100 times. Since the inside of an automobile is subjected to hot and cold atmospheres repeated, a large amount of time is required until the temperature inside the image pickup module stabilizes in all over the module. Accordingly, there is often a difference between the base length between the image-forming lenses and the base length between the CCDs.

Even if an aluminum member having low thermal expansion is used for the enclosure portion, the materials of the CCD packages and image-forming lenses are limited, so that the thermal stress between the different types of materials in these portions can not be totally eliminated.

In addition, when the CCD holding member 54 and the lens holding member 52 are formed of an aluminum die cast material and the CCD packages 53*a* and 53*b* are formed of ceramics, these members are relatively expensive. The assembly process for such members is also complicated and expensive due to the difficulty in achieving good adhesion and the large number of required parts.

This structure reduces the difference in linear expansion coefficient between the different types of materials when it is compared with the structure in which the CCD-holding member 54 and the lens-holding member 52 are formed of plastics while the CCD packages 53*a* and 53*b* are formed of ceramics. Even in this structure, however, the adhered portions may be displaced or peeled off.

Furthermore, even if the CCD packages 53*a* and 53*b* and the CCD holding member 54 are composed of plastics as shown in FIG. 11, when the CCD packages 53*a* and 53*b* are adhered and joined to the CCD-holding member 54, the direct transmission of heat from CCD chips 58*a* and 58*b* may cause the CCD-holding member to expand noticeably.

When power is turned on, there will be a difference in temperature of about 10° C. between the CCD-holding member and the lens-holding member, which causes a difference in the base length of about 30 μm.

Consequently, the difference in the base length between these members may result in erroneous distance measurement.

Besides the heat from the CCD chips 58*a* and 58*b*, if a D/D converter is mounted on a CCD circuit board to which the CCD packages 53*a* and 53*b* are soldered, heat from this heat source is transmitted to the CCD-holding member 54 causing it to expand and again leading to erroneous distance measurement.

As described above, if one of the image-forming lens, the lens-holding member, and CCD-holding member is composed of a different material, there will be large differences in the base length between the image-forming lenses and the base length between the CCDs.

Ideally, all members are formed of plastics. Since, however, conventional CCD packages 53*a* and 53*b* made of plastics such as those shown in FIG. 11 are normally manufactured by injection-molding an acrylic martial, they are subjected to variation in sizes and internal condensation caused by moisture absorption.

Thus, even if the image-forming lenses, the lens-holding member and the CCD-holding member are all formed of the same material (plastics), the conventional techniques still have many practical problems.

It is thus a main object of this invention to provide a distance-measuring instrument whose size does not vary with moisture absorption even if the image-forming lenses, lens-holding member and photo sensor (CCD) array-holding member are all formed of the same plastic material.

It is another object of this invention to provide a distance-measuring instrument whose distance-measurement accuracy is maintained in all temperature ranges based on the fact that the linear expansion coefficient of the components are equal.

It is yet another object of this invention to provide a distance-measuring instrument that can be manufactured inexpensively.

SUMMARY OF THE INVENTION

To achieve these objects, the invention in the first aspect relates to a distance-measuring instrument comprising image pickup means consisting of a pair of image-forming lenses and photo sensor arrays; and arithmetic means using two images of a measured object photographed by the image pickup means to calculate the distance to the object based on the principle of triangulation.

According to this invention, the image-forming lenses, a holding member for the image-forming lenses, and a holding member for the photo sensor arrays are formed of the same material, which is plastics without hygroscopicity.

The invention in the second aspect is based on the distance-measuring instrument in the first aspect, wherein a coupling member that couples together the holding member for the image-forming lenses and the holding member for the photo sensor arrays is formed of the same material as the above material.

According to the third aspect, the plastics without hygroscopicity are desirably an amorphous cycloolefin polymer.

Furthermore, the invention in the fourth aspect provides the distance-measuring instrument in the first to third aspects, wherein members formed of the same material are joined together by deposition or melt-adhesion with an organic solvent.

The invention in the fifth aspect provides the distance-measuring instrument in the first to fourth aspects, wherein the photo sensor arrays are arranged in such a way that the image-forming lenses, the holding member for the photo sensor arrays, and the photo sensor arrays are placed in that order along the path that the light travels.

BRIEF DESCRIPTION OF THE DRAWINGS

FIG. 3 is an explanatory sectional view depicting inconveniences caused by heat generated by a CCD circuit board;

FIGS. 7(*a*)–7(*d*) are explanatory sectional views showing examples of a fourth embodiment of the invention;

FIGS. 10(*a*) and 10(*b*) are explanatory sectional views showing the effects of differences in locations at which the CCDs are adhered.

DETAILED DESCRIPTION OF PREFERRED EMBODIMENTS

Embodiments of this invention are described below with reference to the drawings.

Figure 1:
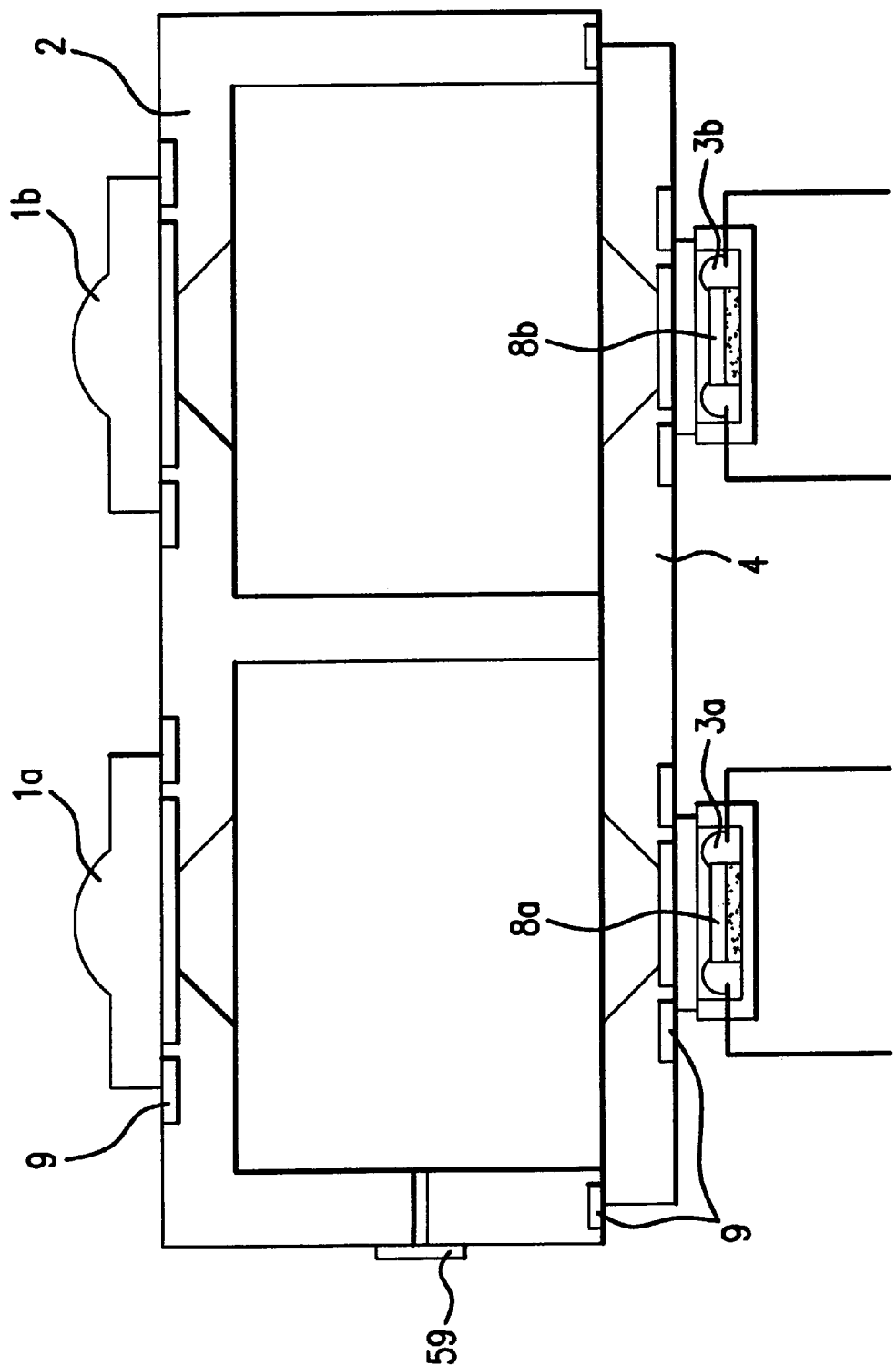
FIG. 1 is an explanatory sectional view of a first embodiment of the invention.

FIG. 1 is a vertical sectional view of the first embodiment. The illustration and description of arithmetic means for calculating the distance to a measured object based on the principle of triangulation are omitted.

A pair of image-forming lenses 1a and 1b is fixed to a lens-holding member (hereafter referred to as a "frame") in such a way as to be spaced by a base length (a predetermined inter-optical-axis distance), and a pair of CCD packages 3a and 3b acting as photo sensor arrays is similarly fixed to a CCD-holding member (hereafter referred to as a "plate") in such a way as to be spaced by a base length. Reference numerals 8a and 8b designate CCD chips.

Furthermore, after the optical axes of the image-forming lenses 1a and 1b and the CCD packages 3a and 3b have been adjusted, the frame 2 and the plate 4 are secured together by pouring a solvent into solvent casting ports 9.

Figure 9:
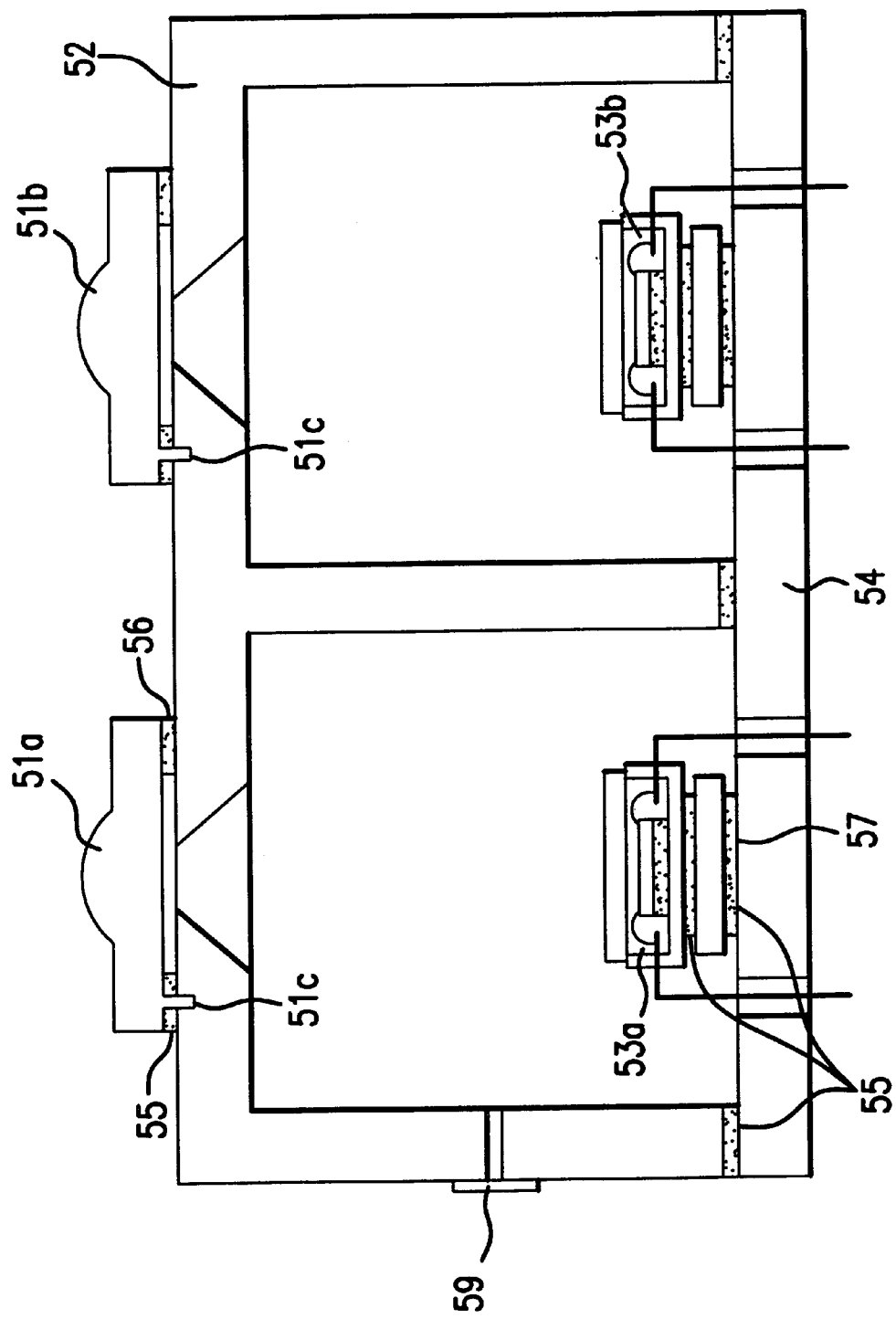
FIG. 9 is an explanatory sectional view of a conventional distance-measuring instrument.
Figure 11:
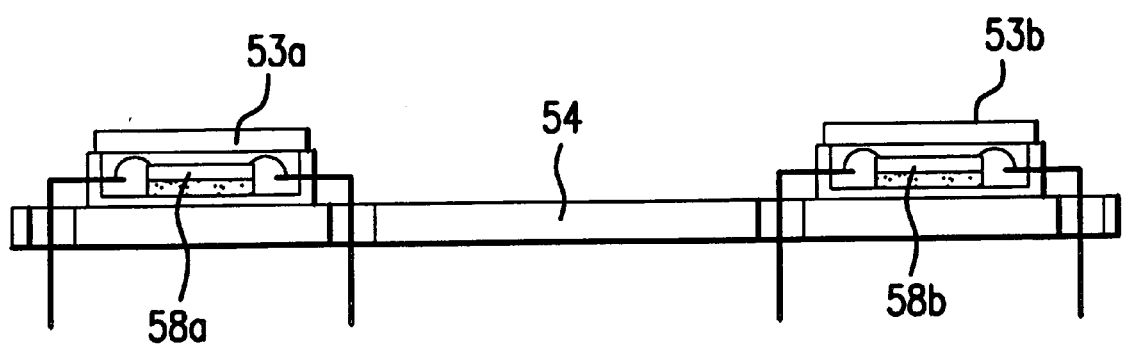
FIG. 11 is an explanatory sectional view showing an arrangement of conventional CCD packages.

As described above, according to the conventional techniques, the frame 52 and plate 54 in FIG. 9 are composed by an aluminum die cast, and the CCD packages 53a and 53b in the same figure are formed of ceramics. According to this embodiment, however, the frame 2, the plate 4, and the CCD packages 3a and 3b are all composed of plastics (amorphous cycloolefin polymer (COP)) that constitute the image-forming lenses 1a and 1b.

The image-forming lenses 1a and 1b are transparent, whereas the frame 2, the plate 4, and the CCD packages 3a and 3b are black, and these components are formed of the same material.

By making all the major components from the same plastic material, the components can be joined together by using an organic solvent, such as toluene, without using adhesives.

Melt-adhesion is advantageous in that the surfaces of the plastics are melted by the solvent and after the solvent has evaporated, the molecules are firmly bonded together to provide an integral plastic material.

In contrast to the use of adhesives, this embodiment does not require complicated assembly processes such as application of the adhesives, UV temporary fixation and thermosetting, thereby substantially reducing manufacturing costs.

Furthermore, since amorphous cycloolefin polymer has almost no moisture absorption as compared to an acrylic material, the image-forming lenses 1a and 1b, the frame 2, the plate 4 and the CCD packages 3a and 3b are precluded from variation in size caused by moisture absorption, thereby eliminating difference in the base length between the image-forming lenses and the base length between the CCDs.

The differences in the base length between the image-forming lenses and the base length between the CCDs must be prevented despite the variations in temperature and moisture. Thus, the image-forming lenses 1a and 1b, the frame 2, the plate 4, and the CCD packages 3a and 3b may be formed of different materials as long as the base length between the image-forming lenses and the base length between the CCDs vary at the same rate. In practice, however, it is difficult to find different types of materials that meet such requirements. Thus, the same material is optimally used by taking into account the advantages obtained by the deposition or melt-joining between the components.

FIG. 2 shows the operation of the embodiment.

Figure 2A:
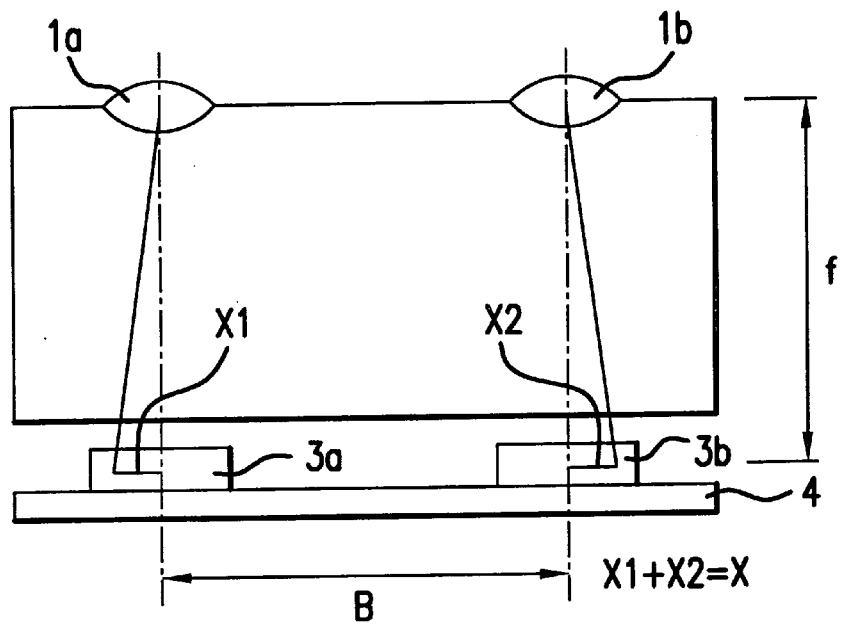
FIGS. 2(*a*) and 2(*b*) are explanatory views showing the operation of the first embodiment.

Based on the principle of triangulation described in the "Prior Art" section, the distance L to the measured object is given by Equation 1 (see FIG. 2(a)).

Figure 2B:
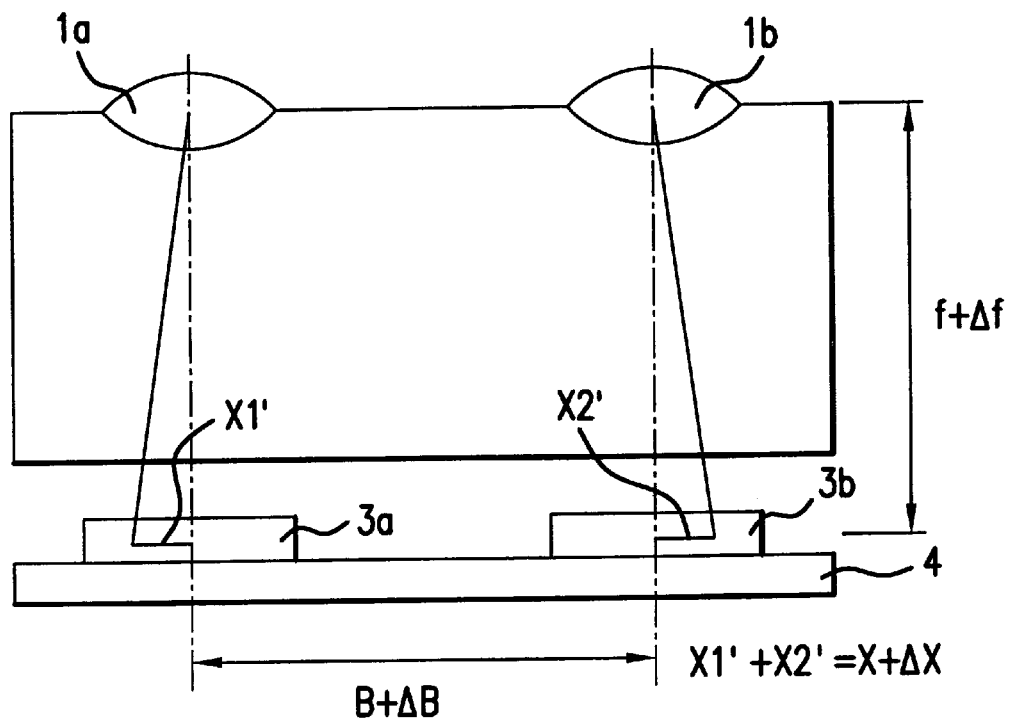

FIG. 2(b) shows the thermal expansion of the entire module constituting the image pickup means.

The product of $(B+\Delta B)$ and $(f+\Delta f)$ is proportional to the amount of offset $(X+\Delta X)$, so the detected distance L to the measured object does not vary despite the thermal expansion of the entire module.

This is because the entire module is composed of the same plastic material and thermal expansion accordingly spreads uniformly in each direction. As a result, the optical triangles used for distance measurement are similar, as described above.

Thus, the accuracy in the distance measurement is not affected as long as the entire module is composed of the same material (plastic) and as long as heat is uniformly transmitted.

As shown in FIG. 3, however, the CCD circuit board 10 is soldered to the CCD packages 3a and 3b. Since the CCD circuit board 10 is a printed circuit board on which CCDs and CPUs are mounted via cables to deliver signals, electronic parts, such as D/D converters, located on the CCD circuit board are expected to be heated.

In addition, since the CCD circuit board 10 virtually adheres to the plate 4, heat from the CCD circuit board 10 is directly transmitted to the plate 4.

In general, due to the high thermal expansion and low thermal conductivity of plastics, the plate 4 is elongated by thermal expansion but heat is not transmitted to the frame 2. The difference in temperature between the plate 4 and the frame 2 results in a different elongation percentage.

Consequently, the base length between the image-forming lens 1a and 1b differs from that between the CCD packages 3a and 3b, thereby slightly reducing the distance measuring accuracy until the entire module reaches a constant temperature.

Figure 4:
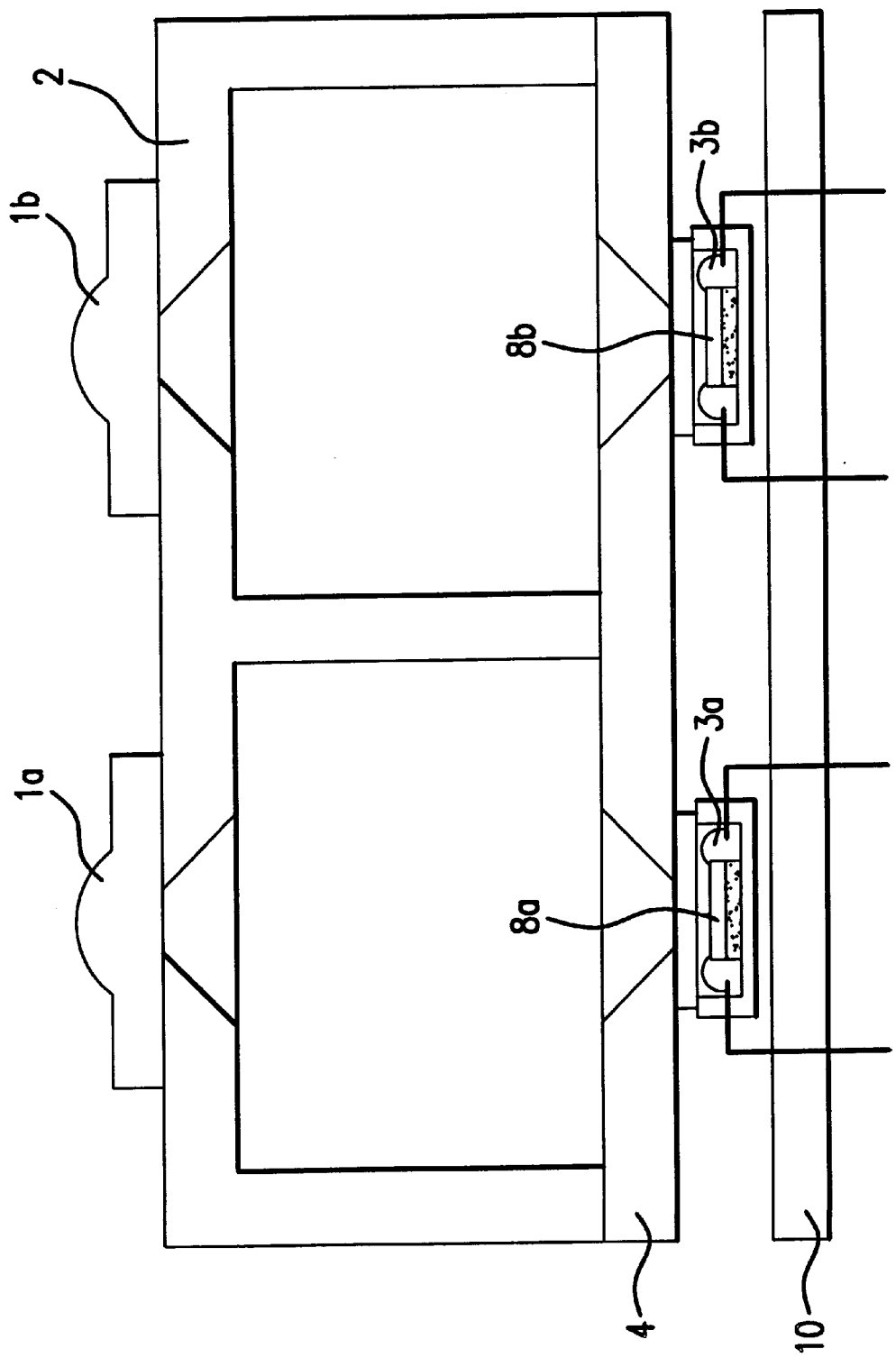
FIG. 4 is an explanatory sectional view showing an improved CCD mounting structure according to the first embodiment.

As shown in FIG. 4, the CCD packages 3a and 3b are joined with the plate 4 from the rear such that the image-forming lenses 1a and 1b, the plate 4 and the CCD packages 3a and 3b are arranged in this order from the direction of light incidence, and the plate 4 is spaced from the CCD circuit board 10 to prevent heat from the electronic parts on the CCD circuit board 10 from reaching the plate 4.

In addition, since the CCD packages 3a and 3b are filled with gel (not shown), heat from the CCD chips is not transmitted to the plate 4 easily to minimize the decrease in distance measuring accuracy caused by the heat.

Figure 5:
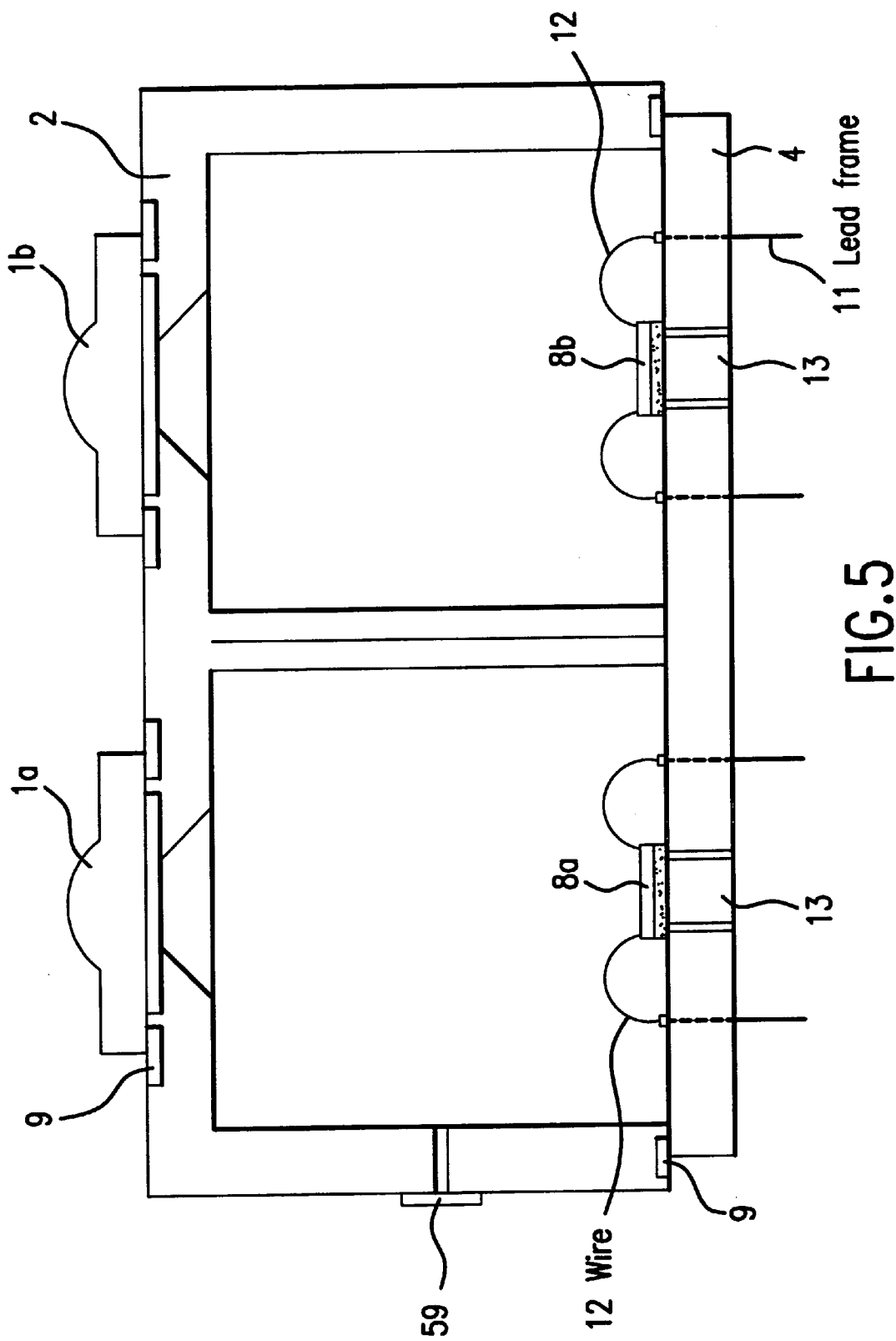
FIG. 5 is an explanatory sectional view of a second embodiment of the invention.

FIG. 5 is a sectional view of a second embodiment.

The second embodiment has a structure in which the CCD chips 8a and 8b are directly mounted on the plate 4, thereby reducing the number of parts and assembly steps required for the CCD packages.

The plate 3 has lead frames 11, and die pads (not shown) located under the shaded part (thermosetting adhesive) under the CCD chips 8a, 8b. The die pads serve to adhere the CCD chips 8a and 8b to the plate smoothly.

After wires 12 have been connected to the CCD chips 8a and 8b, gel (not shown), which is filled so as to cover the wires 12, can be placed over the wires to protect them from dust and moisture.

The gel covers the wires 12 and protects them from direct contact with air.

In addition, heat from the CCD chips 8a and 8b can be released from the rear by insulating materials 13 imbedded in the plate 4.

The insulating materials 13, however, are not required if the CCD chips are MOS chips that generate low heat.

FIGS. 6(a)–6(e) are sectional views of a third embodiment.

The third embodiment is obtained by changing the combination of the structures in the enclosure of the frame/plate according to the first embodiment, and is designed for easiness in assembly and in making design changes so as to meet different specifications, and reduction in cost and size.

Figure 6A:
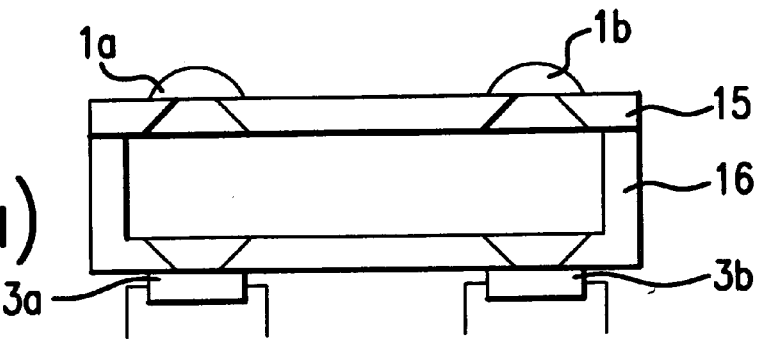
FIGS. 6(*a*)–6(*e*) are explanatory sectional views showing examples of a third embodiment of the invention.

In the frame/plate inverted type as shown in FIG. 6(a), the structures according to the first and second embodiments are inverted. This inverted type makes it simple to adjust jigs in the optical-axis adjustment mechanism for the image-forming lenses and CCDs and helps improving accurate positioning when assembling these jigs.

Since the CCD packages 3a and 3b are mounted on the printed circuit board (not shown) and the optical axes are adjusted while viewing output signals from the CCDs, assembly can be achieved without being affected by noise or stress, especially by installing the plate 15 for the image-forming lenses 1a and 1b that have no electronics on a rotary stage for the adjustment jigs. The accuracy in assembly also increases. Reference numeral 16 designates a plate.

Figure 6B:
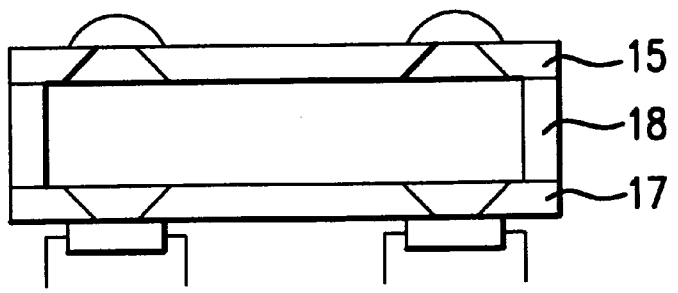

In the frame/plate separated type as shown in FIG. 6(b), since the plates 15 and 17 for the lenses and the CCDs, respectively, are separated via an intermediate coupling member 18, it is possible to utilize lenses with various focal lengths by changing the coupling member 18. Thus, this type is advantageous in changing the specifications for the distance-measurement angle of view.

Figure 6C:
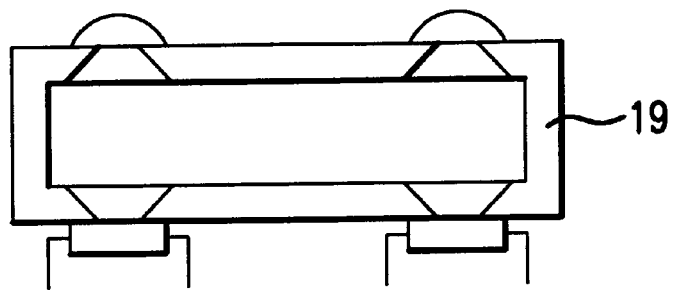

In the frame/plate integrated type as shown in FIG. 6(c), the frame and the plate are integrated together to form a frame/plate section 19, thereby reducing costs and the number of required parts.

Although an apparatus for assembly the device becomes complicated due to adjustment of the inter-CCD locations and optical axes simultaneously, this structure is particularly advantageous in reducing the time required for assembly.

Figure 6D:
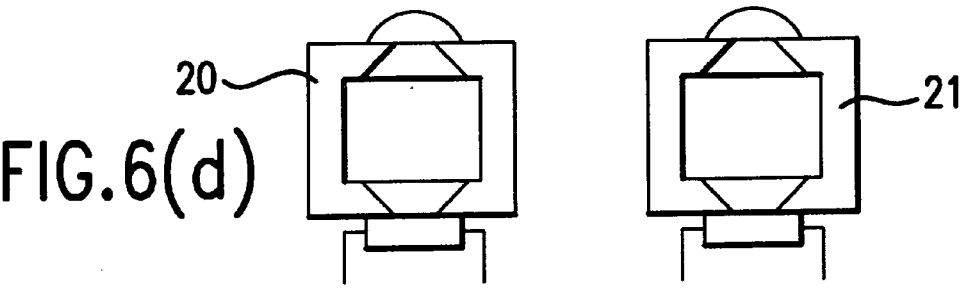

In the type of separated left and right optical systems as shown in FIG. 6(d), the optical systems are separated by using independent frame/plate sections 20 and 21. This separated type is suitable for miniaturization.

Based on the principle of triangulation, the space between the right and left optical systems is not required as long as the components of the right and left optical systems and their locational relationship are accurate. Thus, it is possible to completely separate the systems as shown in this structure, to allow an electronic circuit to be installed in an empty space resulting from this structure.

In addition, although the locational adjustment of the right and left optical systems is inevitably complicated, the optical axes of the lenses and CCDs can be roughly adjusted to allow the individual components to be very simply assembled. Thus, this type is suitable for mass production.

Figure 6E:
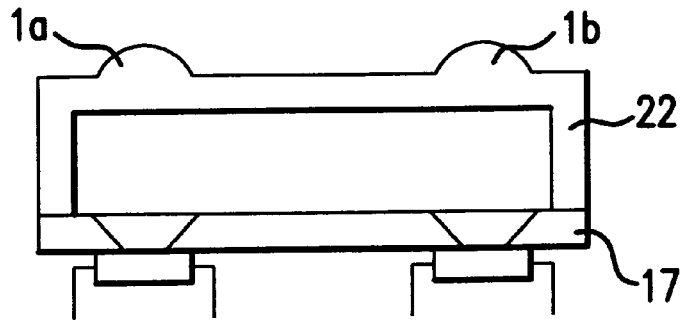
Figure 8:
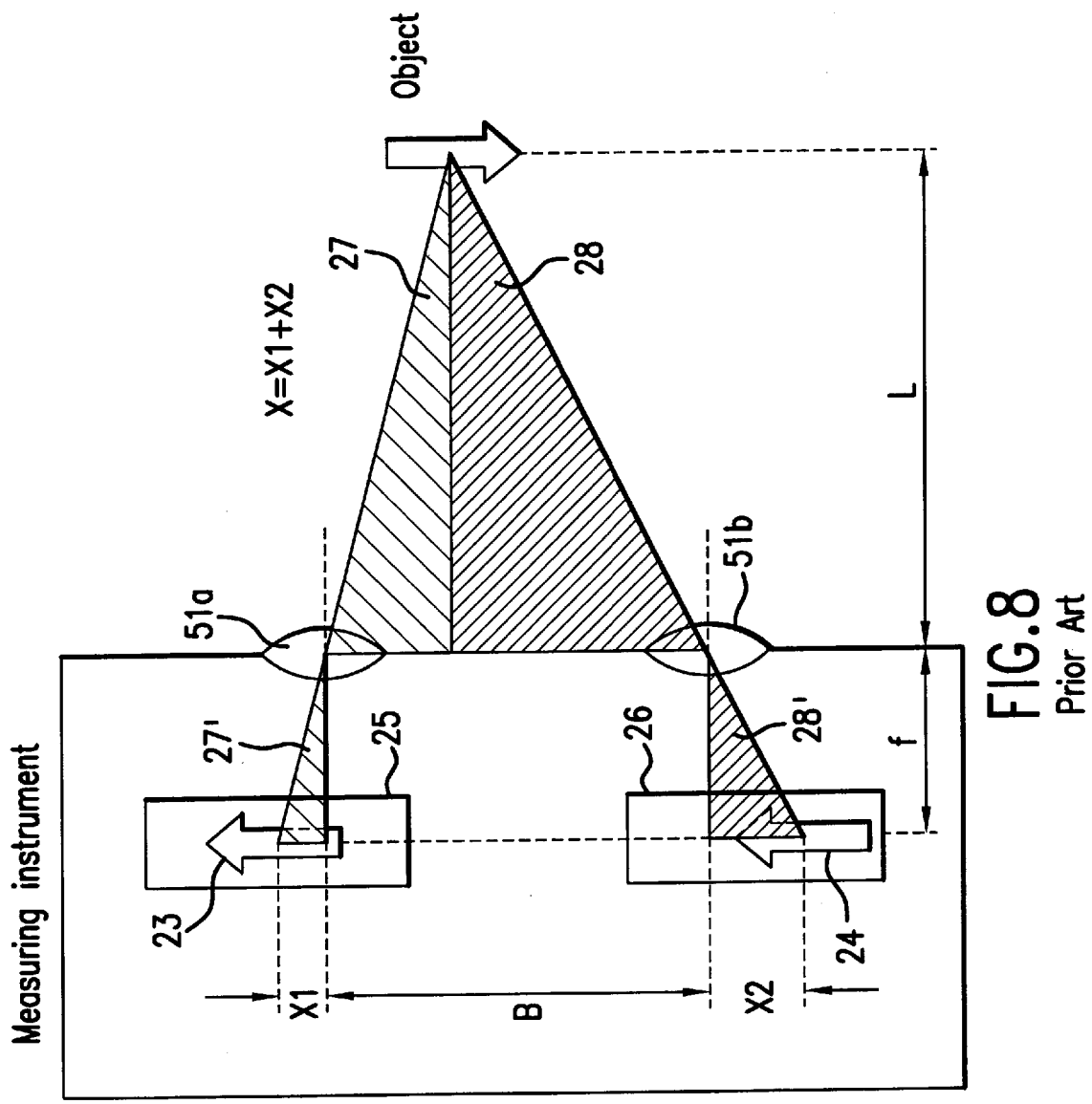
FIG. 8 is an explanatory view showing the principle of triangulation.

Finally, in the lens/frame integrated type as shown in FIG. 6(e), the image-forming lenses and the frame are integrated together to reduce costs. This structure includes a lens/frame section 22 in which the image-forming lenses 1a and 1b and the frame are integrally formed.

In this case, one member can be divided into a transparent portion, i.e. image-forming lenses 1a and 1b, and a black portion, i.e. frame.

In all of these five structures (FIGS. 6(a) to 6(e)), the enclosure can be freely changed due to the use of plastics as the material.

In FIG. 4, if the leads from the CCD packages 3a and 3b are directly soldered to the CCD circuit board 10, there will be an undesirable difference in linear expansion coefficient between the CCD circuit board 10 on which the heat source, such as a D/D converter, is mounted and the CCD packages 3a and 3b or the plate 4. To eliminate this disadvantage, the D/D converter or other heat source may be removed from the CCD circuit board 10 and transferred to a different circuit board.

In addition, the structure used in a fourth embodiment shown in FIGS. 7(a)–7(d) may be employed. In FIGS. 7(a)–7(d), the top portions of the CCD packages 3a and 3b are fixed to the plate 4 as shown in FIGS. 1 and 4, but the illustration of the plate 4 is omitted for convenience.

In the structure shown in FIG. 7(a), leads 31 from the CCD packages 3a and 3b are directly soldered to the CCD circuit boards 10a and 10b, respectively, and these circuit boards 10a and 10b are connected together at an appropriate interval by using a flexible substrate 41. Thus, the interval between the CCD circuit boards 10a and 10b can absorb the increase and decrease in size of each component caused by the difference in linear expansion coefficient between the CCD packages 3a and 3b or the plate 4a and the CCD circuit boards 10a and 10b.

The structure in FIG. 7(b) is an example in which the CCD circuit boards 10a and 10b are connected together by using a connector 42 instead of the flexible substrate 41.

The structure in FIG. 7(c) is an example in which twisted wires 32 are used to mount the CCD packages 3a and 3b on a single CCD circuit board 10 as in FIG. 4. According to this structure, the flexibility of the twisted wires serves to absorb the increase and decrease in size of each component caused by the difference in linear expansion coefficient between the CCD packages 3a and 3b or the plate 4a and the CCD circuit board 10.

The twisted wires 32 may be used for only the CCD package 3b, as shown in FIG. 7(d).

As described above, according to the first and second aspects of the invention, since the image pickup means and its holding means are made of the same plastic material without hygroscopicity, all the components are expanded and elongated under heat equally without thermal stress, and are precluded from changes in size caused by moisture absorption, thereby preventing the distance measuring accuracy from being affected.

That is, the distance measuring accuracy can be maintained at an almost constant level despite variations in temperature or humidity.

In addition, this invention has the advantages: (1) costs can be reduced due to the use of a material suitable for mass production by injection molding; and (2) the device is not affected by vibration and impact due to its small weight. In this invention, also various enclosure structures can be employed.

By using an amorphous cycloolefin polymer having low water absorption (0.01 or lower) as the plastic as disclosed in the third aspect, almost no optical or structural variation or change is caused by humidity, thereby enabling high distance measuring accuracy to be maintained in all temperature and humidity ranges. At the same time, amorphous cycloolefin polymer is excellent in heat resistance and transparency.

According to the invention as disclosed in the fourth aspect, the members, each being formed of the same material, are mutually deposited by using an organic solvent to reduce the number of required assembly steps and thus to lower the manufacturing costs.

According to the invention as disclosed in the fifth aspect, the photosensor arrays can be located on the rear side of the holding member so as to be separated from the circuit board for mounting. This prevents the heat source on the circuit board from affecting the photosensor arrays or the image-forming lenses. As a result, a very accurate distance-measuring instrument can be formed.

What is claimed is:

1. A distance-measuring instrument comprising:

image pickup means including a pair of image-forming lenses for taking images of an object to be measured, photosensor arrays for receiving the images passing through the image-forming lenses, a first holding member for holding the image-forming lenses, and a second holding member for holding the photosensor arrays, said image-forming lenses and first and second holding members being formed of a same plastic material without hygroscopicity; and arithmetic means electrically connected to the photosensor arrays, said arithmetic means receiving signals from the photosensor arrays to calculate a distance to the object based on a principle of triangulation.

2. A distance-measuring instrument according to claim 1, further comprising a coupling member for coupling the first holding member and the second holding member, said coupling member being formed of the same plastic material.

3. A distance-measuring instrument according to claim 1, wherein said plastic material is an amorphous cycloolefin polymer.

4. A distance-measuring instrument according to claim 1, wherein the image-forming lenses and first and second holding members formed of the same plastic material are joined together by melt-adhesion with an organic solvent.

5. A distance-measuring instrument according to claim 1, wherein the photosensor arrays are arranged in such a way that the image-forming lenses, the second holding member and the photosensor arrays are placed in that order along a path that light travels.

6. A distance-measuring instrument according to claim 5, further comprising a CCD circuit board disposed under the photosensor arrays with a space therebetween to prevent heat transfer from the CCD circuit board to the photosensor array.

7. A distance-measuring instrument according to claim 6, further comprising an insulating material filled in the space.

8. A distance-measuring instrument according to claim 1, wherein said image-forming lenses and the first holding member are integrally formed as one unit, said first holding member having a color to prevent light from passing therethrough.

9. A distance-measuring instrument according to claim 1, wherein said first and second holding members are integrally formed together as one unit.

10. A distance-measuring instrument according to claim 1, further comprising two CCD circuit boards disposed under and connected to the respective photosensor arrays, said CCD circuit boards being movably connected to each other.

* * * * *